United States Patent
Hildebrandt et al.

(10) Patent No.: US 12,269,516 B2
(45) Date of Patent: Apr. 8, 2025

(54) METHOD FOR OPERATING AN AIR CONDITIONING SYSTEM FOR A VEHICLE, AND AIR CONDITIONING SYSTEM ARRANGEMENT

(71) Applicant: Siemens Mobility GmbH, Munich (DE)

(72) Inventors: Alexander Hildebrandt, Bochum (DE); Gerhard Reiss, Krefeld (DE)

(73) Assignee: Siemens Mobility GmbH, Munich (DE)

( * ) Notice: Subject to any disclaimer, the term of this patent is extended or adjusted under 35 U.S.C. 154(b) by 216 days.

(21) Appl. No.: 18/044,213

(22) PCT Filed: Aug. 6, 2021

(86) PCT No.: PCT/EP2021/072008
§ 371 (c)(1),
(2) Date: Mar. 7, 2023

(87) PCT Pub. No.: WO2022/053234
PCT Pub. Date: Mar. 17, 2022

(65) Prior Publication Data
US 2023/0356759 A1 Nov. 9, 2023

(30) Foreign Application Priority Data
Sep. 9, 2020 (DE) ............ 10 2020 211 279.7

(51) Int. Cl.
*B60R 25/01* (2013.01)
*B61D 27/00* (2006.01)

(52) U.S. Cl.
CPC .............. *B61D 27/0018* (2013.01)

(58) Field of Classification Search
CPC ............ B61D 27/0018; B60H 1/00371; B60H 1/00742; B60H 1/00785; B60H 1/00849
See application file for complete search history.

(56) References Cited

U.S. PATENT DOCUMENTS

| 6,625,995 B2 | 9/2003 | Remond et al. | |
| 2013/0052929 A1* | 2/2013 | Eisenhour | B60H 1/00785 454/75 |
| 2014/0318159 A1 | 10/2014 | Eisenhour | |

OTHER PUBLICATIONS

EU-Verordnungen Nr. 1302/2014 ("TSI Loc/Pas"), Official Journal of the European Union, Nov. 18, 2014.

* cited by examiner

*Primary Examiner* — Yuen Wong
(74) *Attorney, Agent, or Firm* — Laurance A. Greenberg; Werner H. Stemer; Ralph E. Locher

(57) ABSTRACT

A method for operating an air conditioning system for a vehicle for transporting persons. The air conditioning system, depending on the current number of passengers in a passenger compartment of the vehicle (level of occupation), controls a fresh air volume flow to be introduced into the passenger compartment from outside the vehicle in order to maintain a predefined minimum ambient air quality. The air conditioning system determines a total water mass flow, which is currently produced by the passengers in the passenger compartment, on the basis of air-conditioning measurement values and a current value for at least one operating parameter of the air conditioning system. From the total water mass flow and a predefined value for a water mass flow produced by a single passenger, the system determines the current number of passengers in the passenger compartment. There is also described an air conditioning arrangement for carrying out the method.

8 Claims, 1 Drawing Sheet

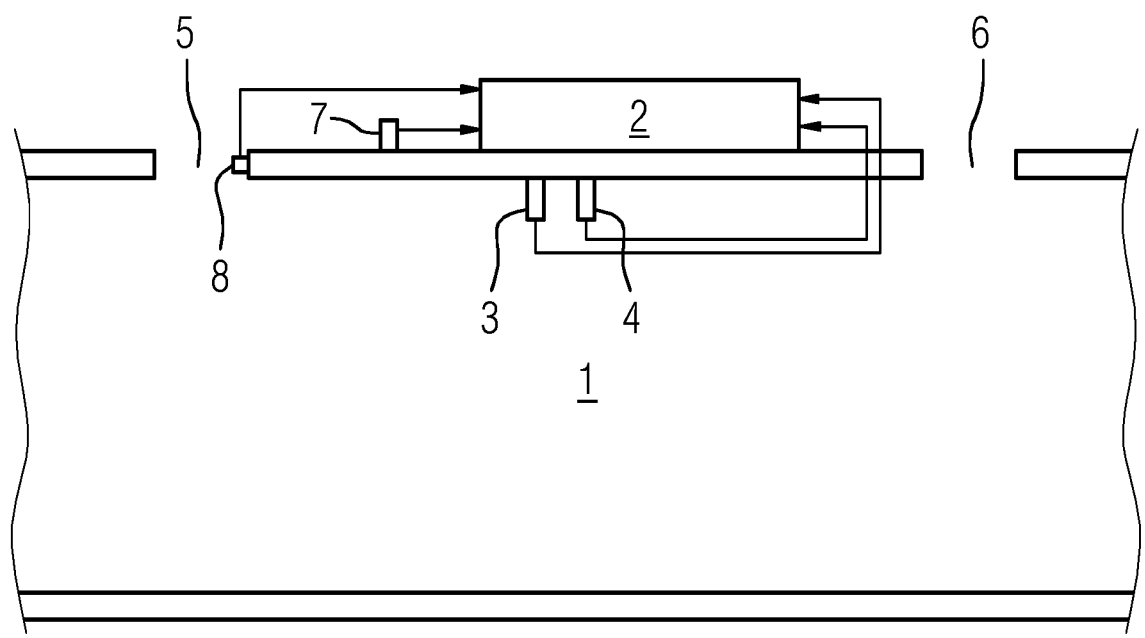

METHOD FOR OPERATING AN AIR CONDITIONING SYSTEM FOR A VEHICLE, AND AIR CONDITIONING SYSTEM ARRANGEMENT

FIELD AND BACKGROUND OF THE INVENTION

The invention relates to a method for operating an air conditioning system for a vehicle for transporting people, wherein, depending on the current number of passengers located in a passenger compartment of the vehicle (level of occupation), the air conditioning system controls a fresh air volume flow that is to be introduced into the passenger compartment from outside the vehicle in order to maintain a predefined minimum compartment air quality, and to an air conditioning arrangement for carrying out this method.

For vehicles for carrying people, relevant standards with regard to the air quality to be maintained in the passenger compartment must be complied with. In the case of rail vehicles, for example, these are EU Directives No 1302/2014 ("TSI Loc/Pas"), which define the air quality requirements to be met in a passenger compartment. In particular, care should be taken here to ensure that a maximum permissible content of carbon dioxide is not exceeded. In addition, the European standards on air conditioning comfort in rail vehicles explicitly specify fresh air volume flows that must be adhered to per passenger. These requirements are included in the relevant specifications by railway vehicle operators. Thus, the air conditioning system used is dependent with respect to its operation on the current number of passengers located in the passenger compartment.

For economical operation of the air conditioning system, the aim is to reduce the fresh air volume flow to the permissible minimum in accordance with the relevant standards and, where applicable, further requirements. However, this is only permissible if the current number of passengers located in the passenger compartment is known.

Given this background, the level of occupation of a rail vehicle, for example, is determined in various ways. In a first variant, the tare weight of the vehicle in the elastic supports (air springs) is determined. The number of passengers currently located in the vehicle can then be determined via the difference between the tare weight and the vehicle weight divided by the assumed average weight of a passenger (usually 75 kg).

In another variant, the number of passengers currently located in the passenger compartment is determined by measuring the content of carbon dioxide ($CO_2$) in the compartment air by means of $CO_2$ sensors in recirculated air intakes of the air conditioning systems. In this context, expensive triple sensors are often used for the air temperature, humidity and carbon dioxide content.

Proceeding therefrom, it is the underlying object of the invention to develop a method of the type mentioned at the outset in such a way that the number of passengers currently located in a passenger compartment of a vehicle for transporting people can be determined at lower cost and to specify an air conditioning arrangement suitable for carrying out the method.

With respect to the method, this object is achieved by a method for operating an air conditioning system as claimed.

According to this, the method described at the outset is characterized in that, on the basis of air-conditioning measurement values and a current value for at least one operating parameter of the air conditioning system, the air conditioning system determines a total water mass flow which is currently being produced by the passengers located in the passenger compartment, and, from the total water mass flow and a predefined value for a water mass flow produced by one passenger, determines the current number of passengers located in the passenger compartment.

The method thus makes it possible to dispense with expensive sensors, of the kind required, for example, for determining a $CO_2$ content of the compartment air. For carrying out the method, temperature and humidity sensors are sufficient, the measurement values of which form the basis in a suitable manner for determining the current number of passengers located in the passenger compartment. Determination of the level of occupation of the passenger compartment should take place under quasi-steady-state conditions as regards the mass flows involved. The term "quasi-steady-state" is understood to mean that the result of determining the current number of passengers located in the passenger compartment in the settled state remains within a tolerance band of +/−10% (around the current average), preferably +/−5%.

The air conditioning system preferably determines the current number of passengers located in the passenger compartment by means of the following equation:

$$n = \frac{V_{fr} \cdot (\rho_i \cdot x_i - \rho_{fr} \cdot x_{fr})}{\dot{m}_p}$$

n: number of passengers
$V_{fr}$: fresh air volume flow [m³/h]
$\rho_i$: density of compartment air [kg/m³]
$\chi_i$: specific humidity of the compartment air [kg/kg]
$\rho_{fr}$: density of the fresh air [kg/m³]
$\chi_{fr}$: specific humidity of the fresh air [kg/kg]
$\dot{m}_p$: mass flow of water produced by one person [kg/h].

All the variables contained in the equation can be determined with the aid of temperature and humidity sensors, wherein a temperature dependence of the density of air can also be taken into account.

SUMMARY OF THE INVENTION

The air conditioning system can preferably have signal connections to respective sensors for an external temperature and an external humidity of the fresh air, an internal or recirculated air temperature and an internal or recirculated air humidity of the compartment air and, for calculating the number of passengers currently located in the passenger compartment, can use, as a value for the at least one operating parameter of the air conditioning system, a current set value of the air conditioning control system or of the train control system for the fresh air volume flow in accordance with the current operating state of the air conditioning system. Alternatively, the current fresh air volume flow could also be determined by measurement.

Here, a water mass flow produced by one person can be obtained from the quotient of latent heat emission of the human person and the specific enthalpy of evaporation of the water. The latent heat emission of the human person, normally clothed and seated, can be taken from air conditioning comfort standards for rail vehicles, such as EN 14813, EN 14750 or EN 13129.

The method presented here presupposes that an overall balance for the water mass flow emerging from the passenger compartment forms the water mass flow introduced via the fresh air plus the water mass flow produced by the passengers currently located in the passenger compartment. For this purpose, it should be noted that condensation of water vapor in the vehicle, in particular in the rail vehicle, must be avoided, because it distorts the mass balance and thus also the result. However, the probability of falling below the dew point in the vehicle is low, particularly in the case of new rail vehicles, which are generally well insulated. However, if condensation of the water vapor does occur, the method can optionally be carried out while allowing for corrections, where assumptions would have to be made as to the extent to which the water vapor condenses in the vehicle.

With regard to the air conditioning arrangement for a vehicle for transporting people, the abovementioned object is achieved by an air conditioning arrangement as claimed.

It can be assumed here that air conditioning arrangements used in the prior art already comprise a multiplicity of sensors required to carry out the method described above, in particular temperature sensors for the interior air and the exterior air/fresh air as well as a humidity sensor for the interior air.

Compared to known air conditioning arrangements, the air conditioning arrangement presented here is characterized in that the air conditioning arrangement has a sensor for an external humidity of the fresh air and is designed in such a way that, on the basis of measurement values which are supplied by the sensors and of a current value for at least one operating parameter of the air conditioning system, it determines a total water mass flow which is currently being produced by the passengers located in the passenger compartment, and, from the total water mass flow and a predefined value for a water mass flow produced by one passenger, determines the current number of passengers located in the passenger compartment.

As far as the sensors are concerned, the air conditioning arrangement need only be expanded by a sensor for an external humidity of the fresh air in order to carry out the method.

Preferred embodiments of the air conditioning arrangement can be found in dependent claims, wherein, in particular, the sensor for measuring the external humidity should be arranged in the region of a fresh air intake of the vehicle. The latter permits reliable measurement of the external humidity, which is the basis for the water mass flow supplied from the outside, which is used in carrying out the method for determining the current number of passengers located in a passenger compartment.

An exemplary embodiment of the invention is explained in greater detail below with reference to the drawing. The single FIGURE shows a schematic illustration of an air conditioning arrangement of a rail vehicle.

BRIEF DESCRIPTION OF THE FIGURE

The single FIGURE is a schematic sectional view of a car of a rail vehicle.

DETAILED DESCRIPTION OF THE INVENTION

The FIGURE shows a longitudinal section of a car body of a rail vehicle, which is used as an example of a vehicle for transporting people. A passenger compartment 1 of the rail vehicle is supplied with conditioned supply air by means of an air conditioning system 2. A current mode of operation of the air conditioning system depends on how many passengers are currently located in the passenger compartment 1, i.e. what level of occupation is currently to be used as a basis for the passenger compartment. Proceeding from this, the air conditioning system 2 has the task of controlling a fresh air volume flow to be introduced into the passenger compartment 1 from outside the vehicle in order to maintain a predefined minimum compartment air quality, and to do this as economically as possible.

Information on current climatic conditions is made available to the air conditioning system 2 via a number of sensors. A temperature sensor 3 and a humidity sensor 4 for determining the specific humidity of the compartment air $\chi_i$ are provided for the interior air which is located in the passenger compartment 1.

In order to supply the passenger compartment 1 with conditioned supply air, the air conditioning system 2 delivers fresh air by way of a fresh air fan (not shown), which introduces fresh air into the passenger compartment 1 from outside the vehicle through a fresh air opening 5. In addition, the air conditioning system 2 controls an exhaust air fan (not shown), which conveys room air originating from the passenger compartment 1 through an exhaust air opening 6 to the outside of the vehicle.

In order to determine the climatic parameters of the fresh air to be introduced, the air conditioning arrangement comprises an external temperature sensor 7 and a humidity sensor 8, which is arranged in the region of the inlet opening for fresh air and by means of which the specific humidity of the fresh air $\chi_{fr}$ can be determined.

All the sensors, namely the sensor for the internal temperature 3, the internal humidity 4, the external temperature 7 and the external humidity 8, have signal connections to the air conditioning system 2. This system evaluates the measurement values supplied by the sensors 3, 4, 7, 8 for the various measured variables in order to determine a current number of passengers located in the passenger compartment 1. This is accomplished by means of the following equation:

$$n = \frac{V_{fr} \cdot (\rho_i \cdot x_i - \rho_{fr} \cdot x_{fr})}{\dot{m}_p}$$

n: number of passengers
$V_{fr}$: fresh air volume flow [m³/h]
$\rho_i$: density of compartment air [kg/m³]
$\chi_i$: specific humidity of the compartment air [kg/kg]
$\rho_{fr}$: density of the fresh air [kg/m³]
$\chi_{fr}$: specific humidity of the fresh air [kg/kg]
$\dot{m}_p$: mass flow of water produced by one person [kg/h].

It is apparent that the fresh air volume flow $V_{fr}$ is included in the determination of the number n of passengers currently located in the passenger compartment 1. For this purpose, a current set value of the air conditioning control system or of the vehicle control system is preferably used for the fresh air volume flow $V_{fr}$. Furthermore, the equation comprises the water mass flow $\dot{m}_p$ produced by one person. This is stored as a constant value for the calculation of the number n and is obtained from the quotient of the latent heat emission of the human person and the specific enthalpy of evaporation of the water. Here, the latent heat emission of the human person, normally clothed and seated, can be taken from air conditioning comfort standards for rail vehicles (EN 14813, EN 14750 or EN 13129). In contrast, the specific enthalpy of evaporation of the water is a quantity which can be looked up in tables.

It should be emphasized that, in order to carry out the method explained above for determining the number n of passengers currently located in the passenger compartment 1, known air conditioning arrangements of vehicles, in particular rail vehicles, can in many cases be retrofitted in a simple manner. Frequently, only the humidity sensor 8 for the fresh air which is introduced into the passenger compartment 1 from the outside will have to be added.

It should also be noted that the interior sensor 3 and the humidity sensor 4 can be replaced by a temperature sensor and a humidity sensor which are located in a recirculated-air air conditioning duct of the vehicle if such a duct is provided in the vehicle. A recirculated-air air conditioning duct carries air which originates from the passenger compartment 1 but does not leave the vehicle as exhaust air, instead being mixed in an air distribution box with fresh air sucked in from the outside and returned to the passenger compartment 1, for example.

The invention claimed is:

1. A method for operating an air conditioning system for a vehicle for transporting passengers, the method comprising:
    determining a total water mass flow that is currently being produced by the passengers in a passenger compartment of the vehicle on a basis of air-conditioning measurement values and a current value for at least one operating parameter of the air conditioning system;
    determining, from the total water mass flow and a predefined value for a water mass flow produced by one passenger, a current number of passengers in the passenger compartment; and
    controlling, with the air conditioning system comprising a plurality of sensors, a fresh air volume flow to be introduced into the passenger compartment from outside the vehicle in order to maintain a predefined minimum compartment air quality in dependence on the current number of passengers in the passenger compartment of the vehicle.

2. The method according to claim 1, wherein the air conditioning system calculates the current number of passengers in the passenger compartment by way of the following equation:

$$n = \frac{V_{fr} \cdot (\rho_i \cdot x_i - \rho_{fr} \cdot x_{fr})}{\dot{m}_p}$$

where:
n is the number of passengers;
$V_{fr}$ is the fresh air volume flow [m³/h];
$\rho_i$ is a density of compartment air [kg/m³];
$\chi_i$ is a specific humidity of the compartment air [kg/kg];
$\rho_{fr}$ is a density of the fresh air [kg/m³];
$\chi_{fr}$ is a specific humidity of the fresh air [kg/kg]; and
$\dot{m}_p$ is the mass flow of water produced by one passenger [kg/h].

3. The method according to claim 2, wherein the air conditioning system has signal connections to respective sensors for an exterior temperature, an exterior humidity of the fresh air, an interior or recirculated air temperature, and an interior or recirculated air humidity of the compartment air, and wherein the calculating the number of passengers currently in the passenger compartment comprises:
    using, as a value for the at least one operating parameter of the air conditioning system, a current set value of the air conditioning control system or of a control system for the fresh air volume flow in accordance with the current operating state of the air conditioning system.

4. The method according to claim 3, which comprises measuring the exterior humidity with a humidity sensor arranged in a region of at least one fresh air intake of the vehicle.

5. An air conditioning arrangement for a vehicle for transporting passengers, the air conditioning arrangement comprising:
    an air conditioning system, having a plurality of sensors and being configured to control, in dependence on a current number of passengers in a passenger compartment of the vehicle, a fresh air volume flow to be introduced into the passenger compartment from outside the vehicle in order to maintain a predefined minimum compartment air quality;
    said air conditioning system having signal connections to respective sensors or an exterior temperature of fresh air, an internal or recirculated air temperature, and an internal or recirculated air humidity of a compartment air;
    a sensor disposed to sense an exterior humidity of the fresh air; and
    said air conditioning system being configured to:
    determine, based on measurement values supplied by said sensors, a current value for at least one operating parameter of the air conditioning system, a total water mass flow that is currently being produced by the passengers currently in the passenger compartment, and
    determine, from the total water mass flow and a predefined value for a water mass flow produced by one passenger, the current number of passengers in the passenger compartment.

6. The air conditioning arrangement according to claim 5, wherein said air conditioning system is configured to calculate the current number of passengers in the passenger compartment by way of the following equation:

$$n = \frac{V_{fr} \cdot (\rho_i \cdot x_i - \rho_{fr} \cdot x_{fr})}{\dot{m}_p}$$

where:
n is the number of passengers;
$V_{fr}$ is the fresh air volume flow [m³/h];
$\rho_i$ is a density of compartment air [kg/m³];
$\chi_i$ is a specific humidity of the compartment air [kg/kg];
$\rho_{fr}$ is a density of the fresh air [kg/m³];
$\chi_{fr}$ is a specific humidity of the fresh air [kg/kg]; and
$\dot{m}_p$ is the mass flow of water produced by one passenger [kg/h].

7. The air conditioning arrangement according to claim 6, wherein the calculating of the current number of passengers in the vehicle comprises using a current set value of the air conditioning control system or of a control system for the fresh air volume flow according to the current operating state of the air conditioning system stored as a value for the at least one operating parameter.

8. The air conditioning arrangement according to claim 5, wherein said sensor for measuring the exterior humidity is disposed in a region of at least one fresh air intake of the vehicle.

* * * * *